US008488232B2

(12) United States Patent
Nakamura et al.

(10) Patent No.: US 8,488,232 B2
(45) Date of Patent: Jul. 16, 2013

(54) OPERATING METHOD FOR STIMULATED RAMAN ADIABATIC PASSAGE AND OPERATING METHOD FOR PHASE GATE

(75) Inventors: Satoshi Nakamura, Tokyo (JP);
Kouichi Ichimura, Kanagawa-ken (JP);
Hayato Goto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 217 days.

(21) Appl. No.: 13/050,628

(22) Filed: Mar. 17, 2011

(65) Prior Publication Data
US 2012/0069414 A1 Mar. 22, 2012

(30) Foreign Application Priority Data

Sep. 21, 2010 (JP) ................ P2010-211409

(51) Int. Cl.
*G06N 99/00* (2010.01)
*B82Y 10/00* (2011.01)
*B82Y 20/00* (2011.01)
*B82B 1/00* (2006.01)

(52) U.S. Cl.
CPC ........... *G06N 99/002* (2013.01); *B82B 1/00* (2013.01); *B82Y 10/00* (2013.01); *B82Y 20/00* (2013.01); *Y10S 977/933* (2013.01)
USPC .......................... 359/333; 977/933

(58) Field of Classification Search
CPC ........ B82Y 10/00; B82Y 20/00; G06N 99/002; G06N 99/00; B82B 1/00
USPC .............. 977/933; 359/333, 107, 108
See application file for complete search history.

(56) References Cited

U.S. PATENT DOCUMENTS

| 6,795,777 | B1 * | 9/2004 | Scully et al. ............ 702/28 |
| 6,800,837 | B1 * | 10/2004 | Ichimura et al. ......... 250/214 R |
| 7,275,010 | B2 * | 9/2007 | Mitschang ............ 702/127 |
| 7,437,533 | B2 * | 10/2008 | Ichimura et al. .......... 712/1 |
| 7,447,719 | B2 | 11/2008 | Goto et al. |
| 7,826,115 | B2 * | 11/2010 | Goto et al. ............ 359/108 |
| 8,049,943 | B2 * | 11/2011 | Goto et al. ............ 359/107 |

(Continued)

OTHER PUBLICATIONS

K. Bergmann et al., "Coherent population transfer among quantum states of atoms and molecules," Reviews of Modern Physics, vol. 70, No. 3, Jul. 1998, pp. 1003 to 1025.

(Continued)

*Primary Examiner* — Mark Hellner
*Assistant Examiner* — Ari M Diacou
(74) *Attorney, Agent, or Firm* — Oblon, Spivak, McClelland, Maier & Neustadt, L.L.P.

(57) ABSTRACT

An operating method for stimulated Raman adiabatic passage to change probability amplitude in a three-level system including states of $|0\rangle$, $|1\rangle$ and $|e\rangle$, includes the following two steps. One is to direct a first laser beam and a second laser beam which have frequencies in the vicinity of resonance frequencies corresponding to energy differences between $|0\rangle$ and $|e\rangle$ and between $|1\rangle$ and $|e\rangle$, respectively. The other is to change temporally two-photon detuning to be a difference between first detuning and second detuning. The first detuning is a difference between a first energy difference and a frequency of the first laser beam. The first energy difference is a difference between energy of $|0\rangle$ and energy of $|e\rangle$. The second detuning is a difference between a second energy difference and a frequency of the second laser beam. The second energy difference is a difference between energy of $|1\rangle$ and energy of $|e\rangle$.

5 Claims, 14 Drawing Sheets

U.S. PATENT DOCUMENTS

| | | | |
|---|---|---|---|
| 8,106,717 B2* | 1/2012 | Ichimura et al. | 331/94.1 |
| 2004/0167751 A1* | 8/2004 | Mitschang | 702/198 |
| 2009/0091812 A1 | 4/2009 | Goto et al. | |
| 2009/0213444 A1* | 8/2009 | Goto et al. | 359/107 |
| 2010/0251049 A1 | 9/2010 | Goto et al. | |

OTHER PUBLICATIONS

Iavor I. Boradjiev et al., "Stimulated Raman adiabatic passage with unequal coupling: Beyond two-photon resonance," The American Physical Society, Physical Review A 81, 2010, pp. 053415-1 to 053415-11.

Hayato Goto et al., "Stimulated Raman adiabatic passage with small two-photon detunings and its geometrical description," ScienceDirect, Physics Letters A 372, 2008, pp. 1535 to 1540.

G.G. Grigoryan et al., "Adiabatic population transfer in three-level system with non-zero two photon detuning," Optics Communications 198, Oct. 15, 2001, pp. 107 to 113.

Hayato Goto et al., "Observation of coherent population transfer in a four-level tripod system with a rare-earth-metal-ion-doped crystal," The American Physical Society, Physical Review A 75, 2007, pp. 033404-1 to 033404-14.

M.V. Danileiko et al., "Landau-Zener transitions and population transfer in a three-level system driven by two delayed laser pulses," Optics Communications 109, Jul. 15, 1994, pp. 462 to 466.

V.I. Romanenko et al., "Adiabatic population transfer in the three-level A-system: two-photon lineshape," Optics Communications 140, Aug. 1, 1997, pp. 231 to 236.

* cited by examiner

OPERATING METHOD FOR STIMULATED RAMAN ADIABATIC PASSAGE AND OPERATING METHOD FOR PHASE GATE

CROSS REFERENCE TO RELATED APPLICATION

This application is based upon and claims the benefit of priority from the prior Japanese Patent Application No. 2010-211409, filed on Sep. 21, 2010, the entire contents of which are incorporated herein by reference.

FIELD

Embodiments relate basically to a highly efficient operating method for stimulated Raman adiabatic passage and a highly efficient operating method for phase gate which are applicable to quantum computation methods using light.

BACKGROUND

Recently, there has been desired a quantum computer using quantum superposition as a bit to memorize arithmetic information. The quantum computer operates a qubit memorizing information to enable a basic gate of the quantum computer. In particular, the basic gate of the quantum computer corresponding to single qubit is broadly classified as either a rotation gate to shift populations (i.e., square of probability amplitude) of a state |0> and a state |1> or a phase gate to change a relative phase between the state |0> and the state |1>. That is, the phase gate is one of single-qubit gates which are basic gates of the quantum computer and also important structural elements of the quantum computer.

Further, as a mounting method of the quantum computer, there has been widely known a method. The method uses a system which has some energy levels of a material having a long duration of a quantum superposition as a qubit and apply some coherent laser at a frequency which is in the vicinity of a resonance frequency of the energy level to the system thereby perform gate operation.

In the gate operation, efficiency decreases when an eigenstate of the system showing a qubit transitions to another eigenstate during the gate operation. An adiabatic condition to be expressed with [Expression 1] is used as an index to represent a probability of the transition.

$$|\langle \dot{\phi} | \phi' \rangle| \ll |\omega_\phi - \omega_{\phi'}|$$

The adiabatic condition of a transition from an eigenstate $|\phi\rangle$ to another eigenstate $|\phi'\rangle$ is defined by the following expression using an eigenvalue $\omega_\phi$ of the eigenstate $|\phi\rangle$. Here, the dot shows time-derivative. Further, in the present specification, the following equation is defined as a non-adiabatic effect.

$$\frac{|\langle \dot{\phi} | \phi' \rangle|}{|\omega_\phi - \omega_{\phi'}|} \equiv A$$

It has been known that the gate operation is efficient without excitation of a lower level to an upper level in a resonance state in which a degree of detuning is sufficiently smaller than an energy level difference of a material, the degree of detuning being a difference between an energy value of a laser photon and the energy level difference of the material. In particular, it has been known that high efficiency is obtained when two-photon detuning is zero, i.e., a two-photon resonance improves the efficiency. The two-photon resonance appears when the differences between the respective energy values of two laser incident beams and the two-energy level differences, i.e., the degree of the two-photon detuning is zero.

The following [expression 2] to express a qubit state is changed by a phase gate of the quantum computer. In the phase gate, when the two-photon detuning of the two incident laser beams is zero, a phase shift does not arise and the gate operation cannot be performed in the two-photon resonance. Therefore, the gate operation efficiency is drastically lowered.

$$\phi = a + ib \qquad \text{[Expression 2]}$$

$$\text{phase of } \phi: \theta_\phi = \arctan\left(\frac{b}{a}\right)$$

BRIEF DESCRIPTION OF DRAWINGS

Aspects of this disclosure will become apparent upon reading the following detailed description and upon reference to accompanying drawings. The description and the associated drawings are provided to illustrate embodiments of the invention and not limited to the scope of the invention.

DESCRIPTION

As will be described below, according to an embodiment, an operating method for stimulated Raman adiabatic passage to change probability amplitude of a state $|0\rangle$ and a state $|1\rangle$ used for a qubit in a three-level system X including three states of $|0\rangle$, $|1\rangle$ and $|e\rangle$ in ascending order of energy levels, includes the following two steps. One of the steps is to direct a first laser beam and a second laser beam which have frequencies in the vicinity of resonance frequencies corresponding to an energy difference between $|0\rangle$ and $|e\rangle$ and an energy difference between $|1\rangle$ and $|e\rangle$, respectively. The other is to change temporally two-photon detuning ($\Delta_P - \Delta_S$) to be a difference between first detuning ($\Delta_P$) and second detuning ($\Delta_S$). The first detuning ($\Delta_P$) is a difference between a first energy difference and a frequency of the first laser beam. The first energy difference is a difference between energy of $|0\rangle$ and energy of $|e\rangle$. The second detuning ($\Delta_P$) is a difference between a second energy difference and a frequency of the second laser beam. The second energy difference is a difference between energy of $|1\rangle$ and energy of $|e\rangle$.

According to another embodiment, a method for phase gate operation to rotate a relative phase between a state $|0\rangle$ and a state $|1\rangle$ used for a qubit in a four-level system X including four states of $|0\rangle$, $|1\rangle$, $|2\rangle$ and $|e\rangle$ in ascending order of energy levels, includes the following steps. One of the two steps is to direct a first laser beam and a second laser beam which have frequencies in the vicinity of resonance frequencies corresponding to an energy difference between $|1\rangle$ and $|e\rangle$ and an energy difference between $|2\rangle$ and $|e\rangle$, respectively. The other is to change temporally two-photon detuning ($\Delta_P - \Delta_S$) to be a difference between first detuning ($\Delta_P$) and second detuning ($\Delta_S$). The first detuning ($\Delta_P$) is a difference between a first energy difference and a frequency of the first laser beam. The first energy difference is a difference between energy of $|1\rangle$ and energy of $|e\rangle$. The second detuning ($\Delta_P$) is a difference between a second energy difference and a frequency of the second laser beam. The second energy difference is a difference between energy of $|2\rangle$ and energy of $|e\rangle$.

The disclosure will be described in detail below.

(Phase Gate Operation and STIRAP)

Figure 1:
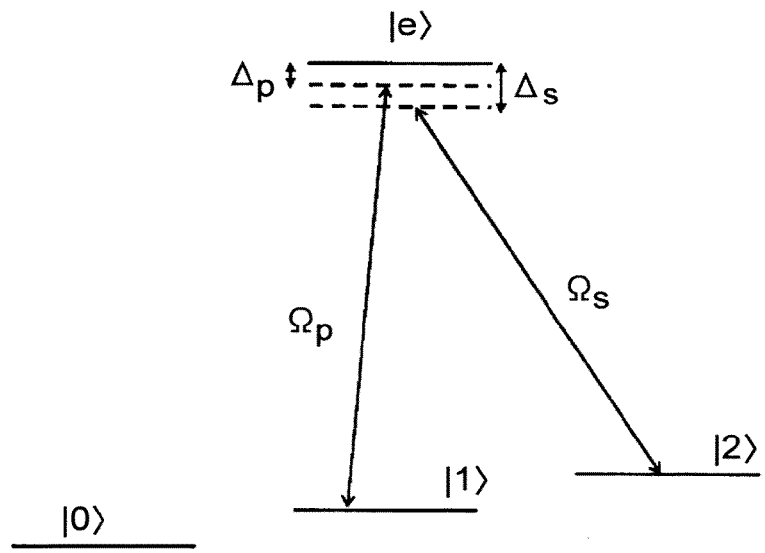
FIG. 1 is a view showing a four-level system, Rabi frequencies and detuning of an incident laser beam according to an embodiment.

FIG. 1 shows a four-level system which is used for the phase gate operation to be explained below. As shown in FIG. 1, the four-level system is a tripod type system including two lower level states $|0\rangle$, $|1\rangle$ and another level state $|2\rangle$. The level $|2\rangle$ is to be subsidiarily used. Two laser beams P, S are directed to the four-level system to rotate a phase between qubits $|0\rangle$ and $|1\rangle$. The two laser beams P, S have frequencies near the resonance frequencies corresponding to the respective energy level gaps. Here, $\Omega_P$, $\Omega_S$ denote Rabi frequencies of the laser beams P, S used for the laser beam irradiation and $\Delta_P$, $\Delta_S$ denote detuning thereof. The state $|0\rangle$ undergoes no laser beam irradiation to have its phase fixed while the phase of $|1\rangle$ shifts. As a result, the relative phase between the states $|0\rangle$ and $|1\rangle$ is shifted. Therefore, it is sufficient to estimate the phase shift of $|1\rangle$ in a lambda-type three-level system (see FIG. 2) including $|1\rangle$, $|2\rangle$ and $|e\rangle$.

In general, performance estimates for quantum state operation such as phase gate operation include (1) capability of reliable transition to a desired final state (i.e., fidelity), (2) no population of an excited state (i.e., suppression of loss due to relaxation), and (3) operability (i.e., robustness).

The phase gate operation performs a non-resonant operation using a laser beam having non-zero detuning to inevitably involve the population of an excited state during the gate operation. Therefore, the phase gate operation has more difficulty in maintaining quantum state operation performances than other quantum state operations.

Meanwhile, there is known a method called STIRAP (STImulated Raman Adiabatic Passage) to transfer population between quantum states as a type of the quantum state operation to be provided with the above performance. The STIRAP irradiates a lambda-type three-level system including three states $|0\rangle$, $|1\rangle$ and $|e\rangle$ with the two laser beams P, S at frequencies in the vicinity of resonance frequencies to transfer population (i.e., square of probability amplitude) between qubits $|0\rangle$ and $|1\rangle$. The resonance frequencies correspond to an energy level difference between $|0\rangle$ and $|e\rangle$ and another energy level difference between $|1\rangle$ and $|e\rangle$. The STIRAP uses substantially the same system as the phase gate operation to have a lot of similarities to the phase gate operation. In general, however, the STIRAP often uses a laser beam having zero detuning and is, therefore, different from the phase gate operation. The phase gate operation will be explained below using the STIRAP which includes detuning.

The STIRAP has an advantage in using an eigenstate called a "dark state" including no excited state. Determining a pulse intensity of a final state enables high fidelity regardless of the transfer path, provided that a state can be transferred along the dark state. The determining also enables a phase gate including no population of an excited state. The STIRAP requires no control of irradiation intensity and duration differently from a quantum state operation using a π pulse. The STIRAP controls just an incident intensity ratio to enable such a quantum state operation, thereby providing high robustness.

In order to ensure the advantages of the STIRAP as described above, an adiabatic condition has to be satisfied. The adiabatic condition is for the quantum state transition along the dark state. Specifically, STIRAP operation is slowly performed in comparison with the energy difference between the eigenstates so that a transition from the dark state to other states is not caused. The operation ensures the advantages of the STIRAP. Accordingly, the performance of the phase gate operation is also evaluated focusing on adiabaticity. The evaluation for the performance is particularly effective when relaxation probability in an excited state is small.

A method to improve adiabaticity of the phase gate operation and a method to confirm the improved adiabaticity by numerical calculations will be described below. The numerical calculation method will be described as formulation common to the phase gate operation and the STIRAP. Specifically, a Hamiltonian, eigenvalues, eigenstates, and adiabatic conditions of a system will be formulated. The adiabaticity of the STIRAP with two-photon detuning will be characterized. Subsequently, the method to improve the adiabaticity of the phase gate operation and the numerical calculations thereof will be also described.

(Hamiltonian, Eigenvalue and Eigenstate)

A Hamiltonian of a three-level system to perform phase gate is expressed with bases in the order of $|1\rangle$, $|e\rangle$ and $|2\rangle$ as follows.

$$H(t) = \frac{\hbar}{2}\begin{pmatrix} 0 & \Omega_P(t) & 0 \\ \Omega_P(t) & 2\Delta_P & \Omega_S(t) \\ 0 & \Omega_S(t) & 2(\Delta_P - \Delta_S) \end{pmatrix} \quad \text{[Expression 3]}$$

Here, $\Delta \equiv \Delta_P$ is called single-photon detuning and $\delta \equiv \Delta_P - \Delta_S$ is called two-photon detuning. A state is called a two-photon resonance when the two-photon detuning is zero. The STIRAP has bases of $|0\rangle$, $|e\rangle$ and $|1\rangle$ but has a similar Hamiltonian. Here, $\theta$ and $\Omega$ to be defined as follows are introduced.

$$\tan\theta \equiv \frac{\Omega_P}{\Omega_S}$$

$$\Omega = \sqrt{\Omega_P^2 + \Omega_S^2}$$

The Hamiltonian is diagonalized to express three eigenvalues and eigenstates with [Expression 4] and [Expression 5], respectively.

$$\omega_n = k\cos\alpha_n + \frac{\Delta + \delta}{3} \quad \text{[Expression 4]}$$

$$k \equiv \sqrt{\frac{4}{3}\left(\frac{(\Delta+\delta)^2}{3} + \Omega^2 - \Delta\delta\right)}$$

$$\alpha_n \equiv \frac{1}{3}\arccos\left[\frac{4}{k^3}\left(-\delta\Omega^2\sin^2\theta + \frac{(\Delta+\delta)(\Omega^2-\Delta\delta)}{3} + \frac{2(\Delta+\delta)^3}{27}\right)\right] + \frac{2}{3}\pi n$$

$$|\phi_0\rangle = D_n^{-1/2}\begin{pmatrix} \alpha_{1n} \\ \alpha_{2n} \\ \alpha_{3n} \end{pmatrix} \quad \text{[Expression 5]}$$

$$\alpha_{1n} \equiv -\Omega^2\cos^2\theta + (\omega_n - \Delta)(\omega_n - \delta)$$

$$\alpha_{2n} \equiv \Omega(\omega_n - \delta)\sin\theta$$

$$\alpha_{3n} \equiv \Omega^2\sin\theta\cos\theta$$

$$D_n \equiv \sum_{i=1}^{3}\alpha_{in}^2$$

In particular, the three eigenvalues and eigenstates are as follows when both $\Delta$ and $\delta$ are zero.

$$\omega_0 = 0$$

$$|\phi_0\rangle = \cos\theta|1\rangle - \sin\theta|2\rangle$$

$$\omega_\pm = \pm\Omega$$

$$|\phi_\pm\rangle = \frac{1}{\sqrt{2}}(\sin\theta|1\rangle + \cos\theta|2\rangle) \pm \frac{1}{\sqrt{2}}|e\rangle$$

In the two-photon resonance, an eigenstate has an excited state with a zero population (i.e., the dark state). Only the other two eigenstates share the population of excited states. In particular, when both single-photon detuning and two-photon detuning is zero, the other two eigenstates have the equal populations of the excited states. Further, the population values at the respective states $|1\rangle$ and $|2\rangle$ change with a change in $\theta$. For example, when $\theta$ changes from 0 to $\pi/2$, that is, when $\tan\theta$ varies from 0 to $\infty$, the dark state changes so that the population at $|1\rangle$ transfers to $|2\rangle$ without going through $|e\rangle$ during the transition. Accordingly, the initial state is set at $|1\rangle$ (i.e., $\tan\theta=0$) and a Rabi frequency is given to change $\theta$ so that $\tan\theta=\infty$ is obtained in the final state, thereby performing the STIRAP. On the other hand, the two-photon detuning is set to non-zero to shift the phase and $\tan\theta$ is set to zero in both the initial and final states so that the population does not change, thereby performing the phase gate operation.

(Schroedinger Equation)

A Schroedinger equation expressed with [Expression 6] is solved to calculate temporal change of the actual quantum state.

$$i\hbar\frac{d|\phi(t)\rangle}{dt} = H(t)|\phi(t)\rangle \quad \text{[Expression 6]}$$

The population $P_n(t)=|a_n(t)+ib_n(t)|^2$ of each state and the phase $$\theta_n(t) = \arctan\frac{b_n(t)}{a_n(t)}$$

of each state can be obtained, provided that the above differential equation is solved to obtain $$|\phi(t)\rangle = \sum_n [a_n(t) + ib_n(t)]|n\rangle.$$

It is, however, difficult to solve the differential equation analytically in general. The differential equation can be solved numerically.

(Adiabatic Condition)

The adiabatic condition needs to be satisfied in order to transfer population along the eigenstates. The transfer needs to be sufficiently slow in comparison with an eigenenergy difference between eigenstates so that the dark state does not transition to another eigenstate. The adiabatic condition is expressed with the following equations [Expression 7] and [Expression 8] as the condition therefor.

$$|\langle\dot\phi_i|\phi_0\rangle| \ll |\omega_i - \omega_0| \quad \text{[Expression 7]}$$

$$A_i \equiv \frac{|\langle\dot\phi_i|\phi_0\rangle|}{|\omega_i - \omega_0|} \quad \text{[Expression 8]}$$

In the present specification, [Expression 8] to be obtained by dividing the left-hand side of [Expression 7] by the right-hand side of [Expression 7] is defined as a non-adiabatic effect $A_i$ and used as an index to evaluate adiabaticity. The smaller the non-adiabatic effect $A_i$ is, the higher the adiabaticity is.

The adiabatic condition and the non-adiabatic effect $A_i$ can be specifically expressed by using the eigenvalue and the eigenstate obtained analytically. In particular, the adiabatic conditions for the two eigenstates are equivalent to each other when the detuning is zero and can be expressed as follows by using $\theta$ and $\Omega$.

$$\frac{1}{\sqrt{2}}|\dot\theta| \ll \Omega$$

Further, differentiating both hand sides of tan $$\theta \equiv \frac{\Omega_P}{\Omega_S}$$

with respect to time provides the time derivation of θ, thereby allowing it to express the adiabatic condition with the Rabi frequencies as follows.

$$\frac{1}{\sqrt{2}}\left|\frac{\dot{\Omega}_P\Omega_S - \Omega_P\dot{\Omega}_S}{\Omega^2}\right| \ll \Omega \qquad \text{[Expression 9]}$$

(STIRAP Using Gaussian Pulse)

A change of each eigenstate is determined by the Rabi frequency, that is, by pulse setting of the laser beam. Gaussian pulses expressed with [Expression 10] are often used for the pulse setting to perform the STIRAP.

$$\Omega_P(t) = \Omega_0 \exp\left[-\frac{(t-\tau)^2}{2\sigma^2}\right] \qquad \text{[Expression 10]}$$

$$\Omega_S(t) = \Omega_0 \exp\left[-\frac{(t-\tau)^2}{2\sigma^2}\right]$$

Figure 3:
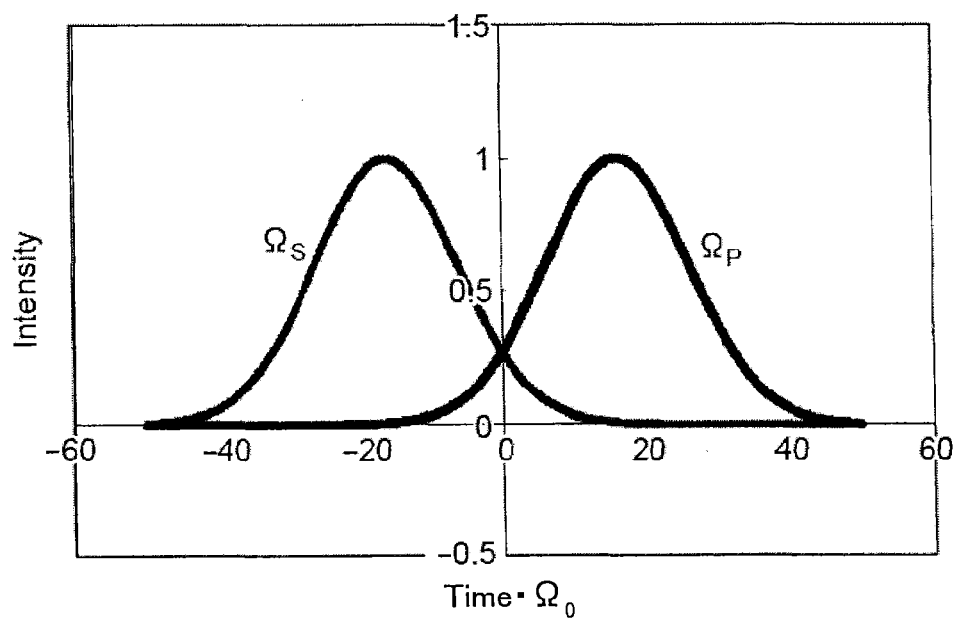
FIG. 3 is a graph showing an example of frequency change of a laser beam for irradiation to perform quantum state operation.

An example of the Gaussian pulses is shown in FIG. 3. The eigenvalue and the eigenstate are expressed as follows using the Gaussian pulse when the single-photon detuning and the two-photon detuning are zero.

$$\tan\Theta \equiv \frac{\Omega_P}{\Omega_S} = \exp\left[-\frac{\tau^2}{\sigma^2}t\right]$$

$$\Omega = \sqrt{2}\,\Omega_0 \exp\left[-\frac{t^2+\tau^2}{2\sigma^2}\right]\sqrt{\cosh\left[\frac{2\tau}{\sigma^2}t\right]}$$

Figure 4:
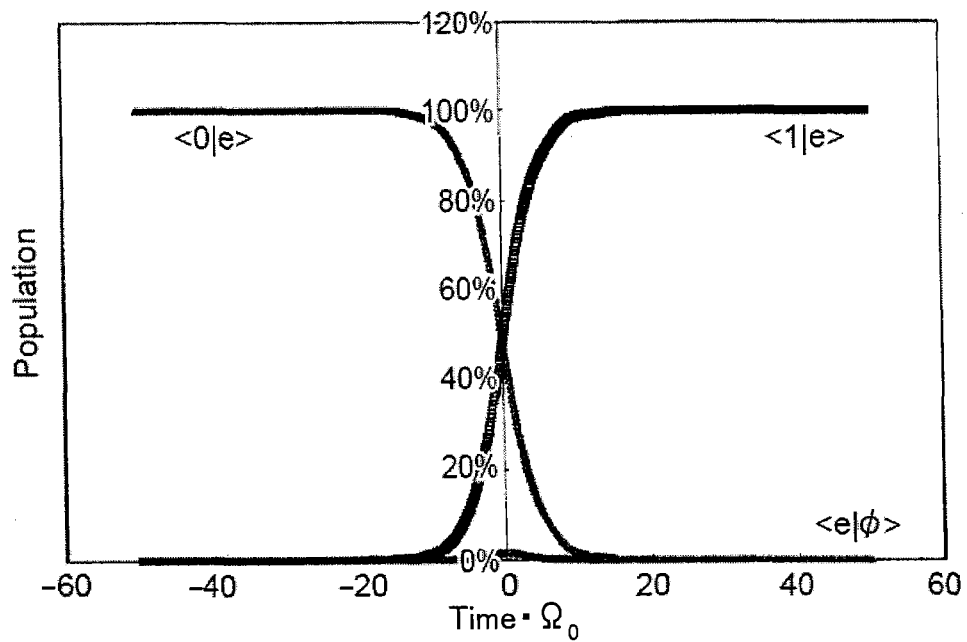
FIG. 4 is a graph showing a change in probability amplitudes of states due to the quantum state operation.

Θ and Ω satisfying these equations enable a temporal change in the dark state from |1> to |2> (see FIG. 4). For this reason, a method to use the Gaussian pulses in the STIRAP has been well known.

Next, a contribution of each pulse-setting parameter to the STIRAP performance will be described.

First, transition time for the dark state to transit from the initial state |1> to the final state |2> will be calculated. When the population of |1> included in the dark state decreases from P to 1−P between the time −$t_0$ to the time $t_0$, the transition time $2t_0$ is obtained as follows.

$$2t_0 = \frac{\sigma^2}{2\tau}\log\left(\frac{P^2}{1-P^2}\right)$$

That is, the transition time is determined by σ and τ, i.e., pulse setting parameters.

Further, the adiabatic condition of the STIRAP with the Gaussian pulses is obtained as follows.

$$\left|\frac{\tau}{\sqrt{2}\,\sigma^2\cosh\frac{2\tau}{\sigma^2}t}\right| \ll \left|\sqrt{2}\,\Omega_0\exp\left[-\frac{t^2+\tau^2}{2\sigma^2}\right]\sqrt{\cosh\left[\frac{2\tau}{\sigma^2}t\right]}\right|$$

The non-adiabatic effect corresponding to the adiabatic condition can be expressed with the following equation [Expression 11].

$$A(t:\tau,\sigma,\Omega_0) \equiv \left|\frac{\tau\exp\left[-\frac{t^2+\tau^2}{2\sigma^2}\right]}{2\sigma^2\Omega_0\left(\cosh\frac{2\tau}{\sigma^2}t\right)^{3/2}}\right| \qquad \text{[Expression 11]}$$

Figure 5:
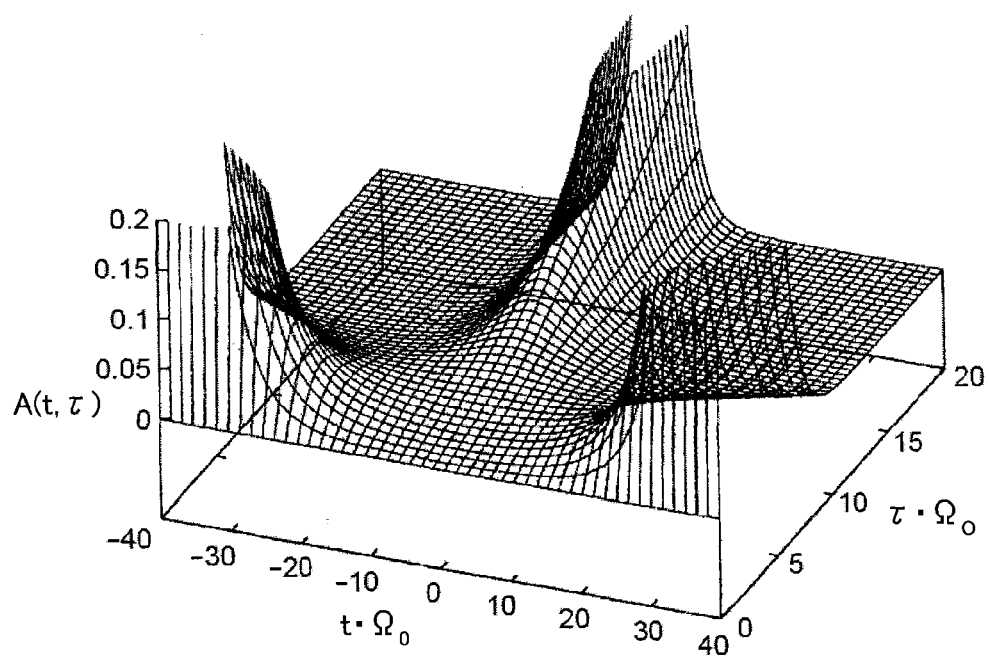
FIG. 5 is a graph showing parameter dependency of a non-adiabatic effect of the quantum state operation.

The transition time of the non-adiabatic effect A is determined by σ and τ which are pulse setting parameters. In general, the adiabatic condition becomes stricter when a rapid population transfer with small $t_0$ is performed. According to the above equation, in a range where the interval between the Gaussian pulses is large, that is, τ is large, the adiabaticity is extremely deteriorated around t=0 at the center of the population transfer. On the other hand, in a range where the interval between the Gaussian pulses is small, that is, τ is small, the adiabaticity is extremely deteriorated around t=±$t_0$ at both ends of the population transfer. The non-adiabatic effect corresponding to the above adiabatic condition is plotted in FIG. 5 using τ and t as parameters.

(Adiabaticity Improvement of STIRAP Using Two-Photon Detuning)

(1) τ<$\tau_0$: A method to release a degeneration of eigenvalues using two-photon detuning When the interval τ between the Gaussian pulses is smaller than an optimal value $\tau_0$, all the respective eigenvalues approach zero and degenerate at the ends of population transfer (see FIG. 6). Accordingly, the adiabaticity is extremely deteriorates (see FIG. 7). Therefore, two-photon detuning is used to change the eigenvalues, thereby improving the adiabaticity.

$$\begin{cases} \Delta_P(t) = c_1 t + c_2 \\ \Delta_S(t) = -c_1 t + c_2 \\ \delta(t) = \Delta_P - \Delta_S \end{cases} \qquad \text{[Expression 12]}$$

Figure 8:
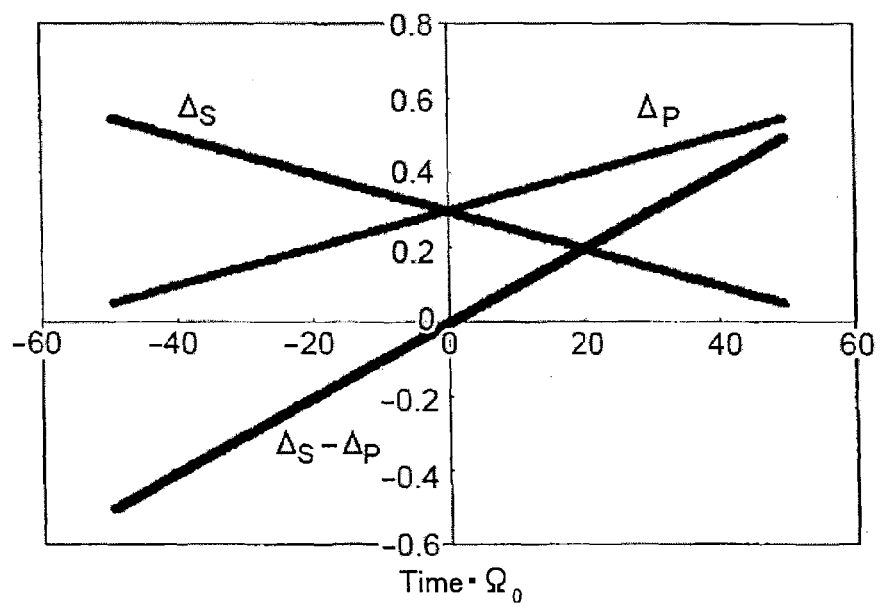
FIG. 8 is a graph showing two-photon detuning to be used in FIG. 6.
Figure 9:
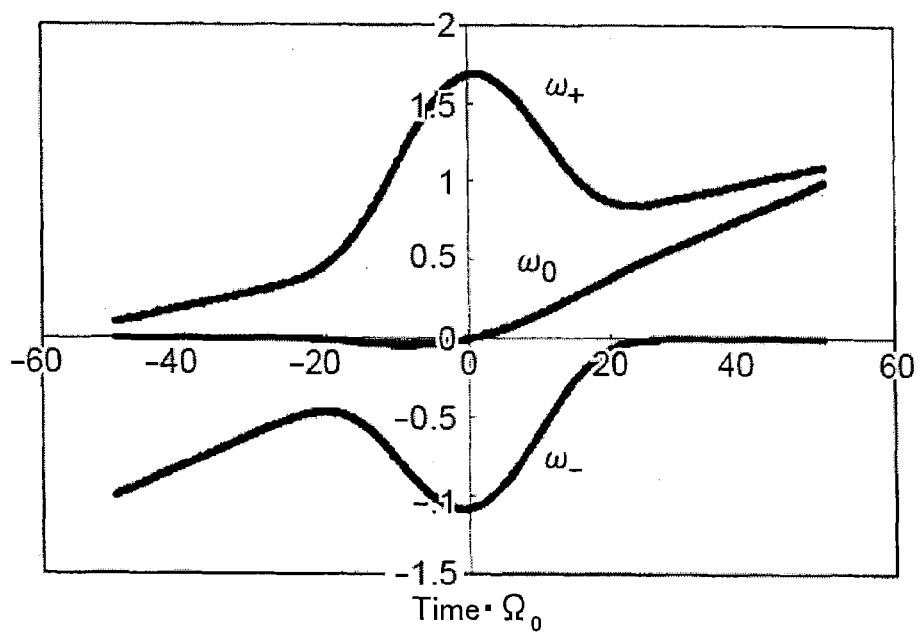
FIG. 9 is a graph showing a state in which the degeneration of the eigenenergy is released as a result of FIG. 8.

As a specific example, two-photon detuning is set in the above equations of [Expression 12] (see FIG. 8), whereby the eigenvalues are split (see FIG. 9). As a result, the adiabaticity at the ends of the population transfer can be remarkably improved (see FIG. 10) and the efficiency of the population transfer can be improved.

(2) τ>$\tau_0$: A method to select a state transition destination using two-photon detuning When the time difference τ between the Gaussian pulses is larger than the optimal value $\tau_0$, the adiabaticity becomes worst at the center of the state transition. In such a case, the adiabaticity dependence of the two-photon detuning is approximately estimated. Under the conditions of Ω>>δ, Δ and t=0, the ratio $$R_\pm = \frac{A_{2pd\pm}}{A_{2pr\pm}}$$

is approximated by the first-order terms of δ and Δ to be expressed with the following expression. Here $A_{2pd\pm}$ is a non-adiabatic effect in a two-photon resonance and $A_{2pr\pm}$ is a non-adiabatic effect in a state involving the two-photon detuning.

$$R_\pm \sim |\pm 1 - f'(\overline{\Delta}, \overline{\delta})|$$

$$f'(\overline{\Delta}, \overline{\delta}) \equiv \frac{\overline{\Delta}}{2} - \frac{3}{4}\overline{\delta}$$

Here, $\overline{\delta} \equiv \delta/\Omega$ and $\overline{\Delta} \equiv \Delta/\Omega$. Further, the excited state population included in the dark state is expressed as follows.

$$P_\pm \sim \frac{1}{2}|\pm 1 + f'(\overline{\Delta}, \overline{\delta})|^2$$

This shows the following. When the adiabaticity at the two-photon detuning becomes worse than that in the two photon resonance, the excited state population included in the eigenstate to be a transition destination at the two-photon detuning becomes smaller than that in the two-photon resonance. That is, there is a possibility that the adiabaticity deteriorates to reduce the excited state population, whereby the transfer efficiency can be improved.

Figure 11:
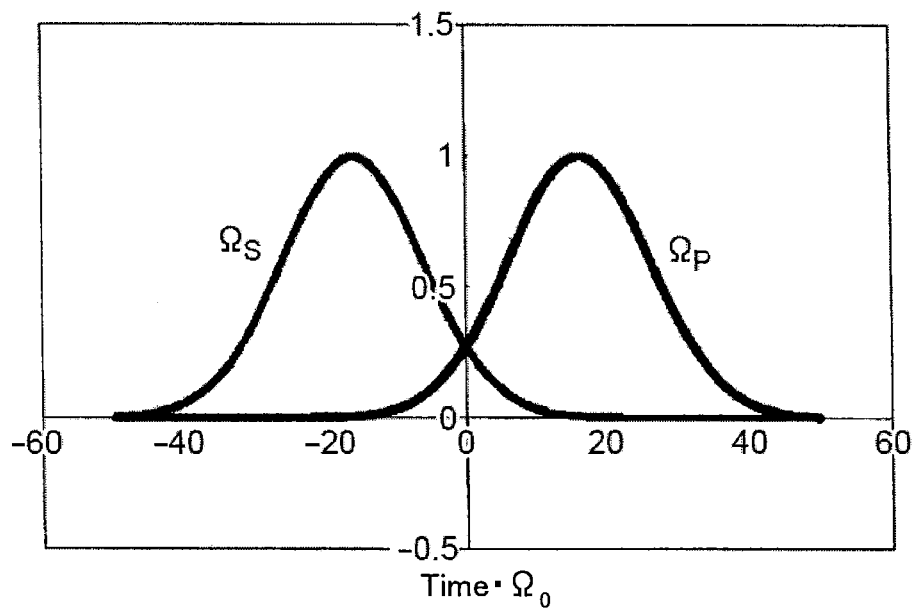
FIG. 11 is a graph showing Gaussian pulses having a wide interval therebetween.
Figure 12:
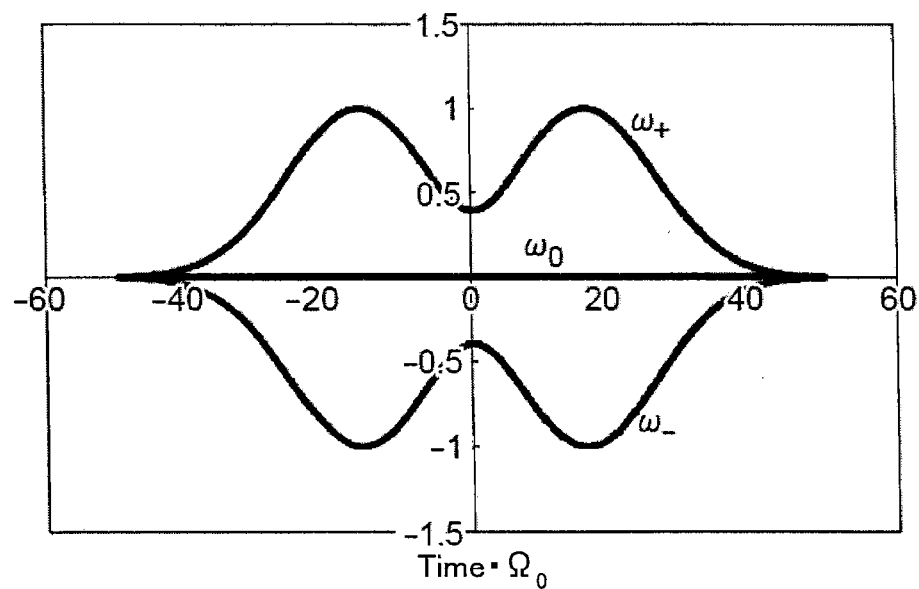
FIG. 12 is a graph showing eigenenergy corresponding to FIG. 11.
Figure 13:
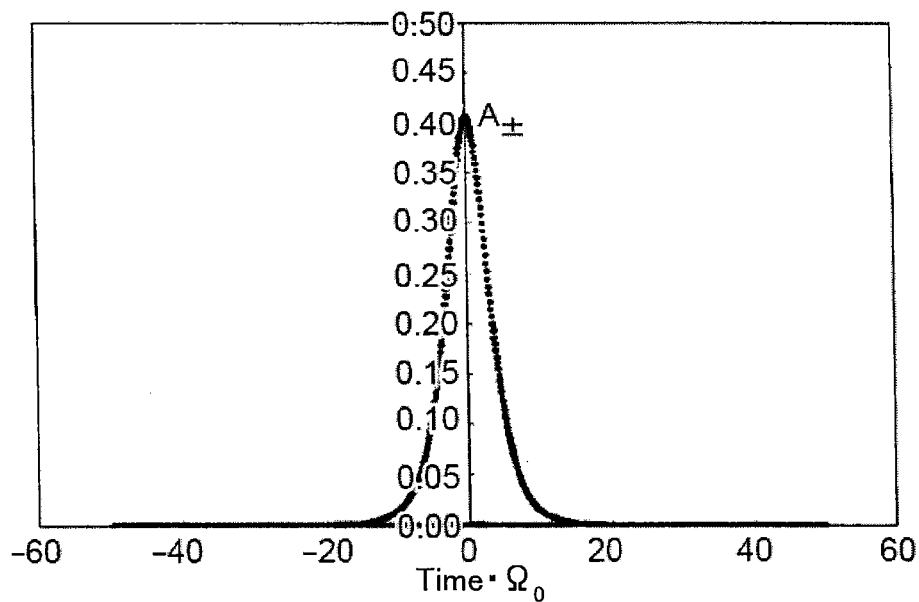
FIG. 13 is a graph showing a non-adiabatic effect corresponding to FIG. 11.
Figure 14:
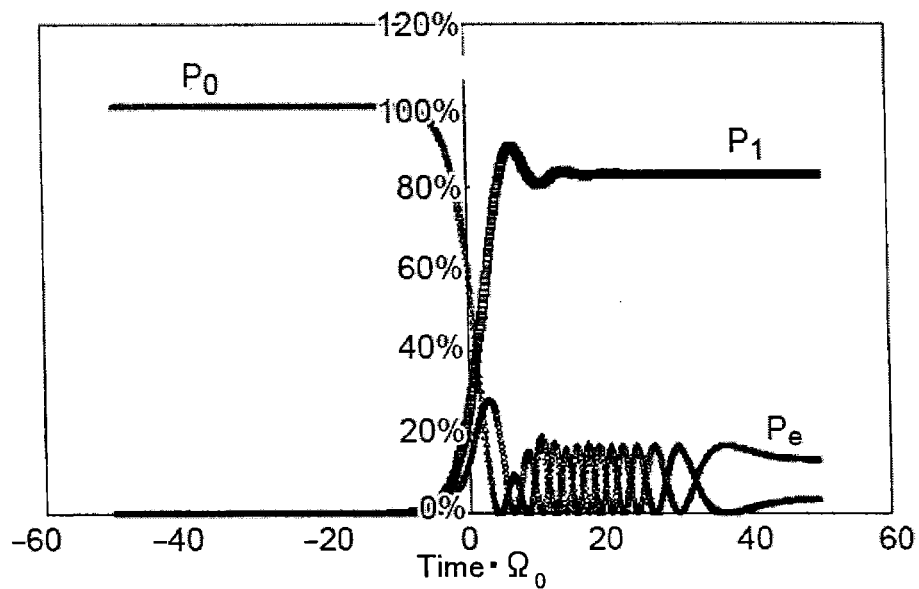
FIG. 14 is a graph showing a population transfer corresponding to FIG. 11.
Figure 15:
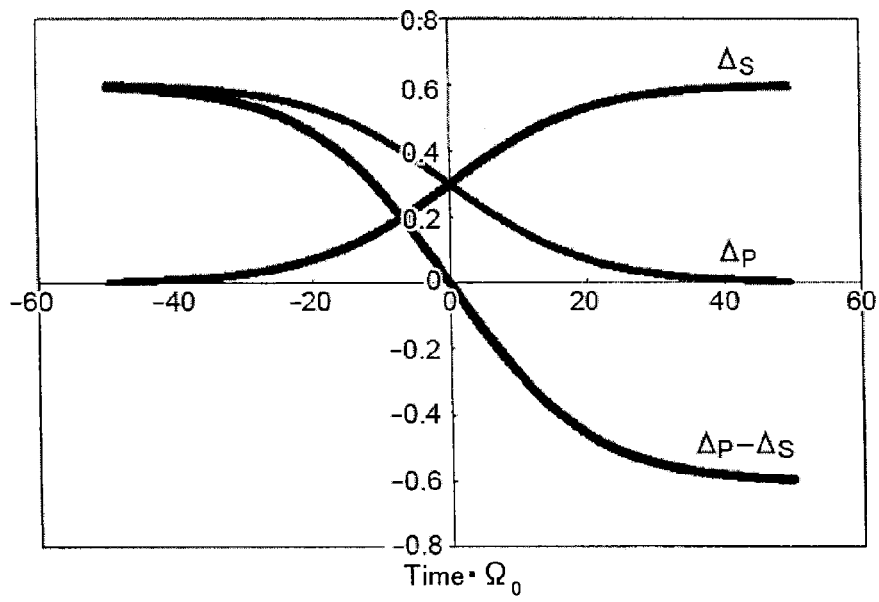
FIG. 15 is a graph of two-photon detuning which is used in FIG. 11.

Here, a specific example using the above methods (1) and (2) is examined by numerical calculations. Two-photon detuning is introduced (see FIG. 15) to the STIRAP having the following problems:

$\tau$ is not an optimal value at two-photon resonance (see FIG. 11);

the eigenvalues are close to each other at the center of the population transfer (see FIG. 12);

the adiabaticity is deteriorated (see FIG. 13); and the population oscillates during the population transfer (see FIG. 14).

The two-photon detuning is expressed with the following [Expression 13].

$$\begin{cases} \Delta_P(t) = c_3(\tanh(-c_4 t) + 1) \\ \Delta_S(t) = c_3(\tanh(c_4 t) + 1) \\ \delta(t) = \Delta_P - \Delta_S \end{cases}$$ [Expression 13]

Figure 16:
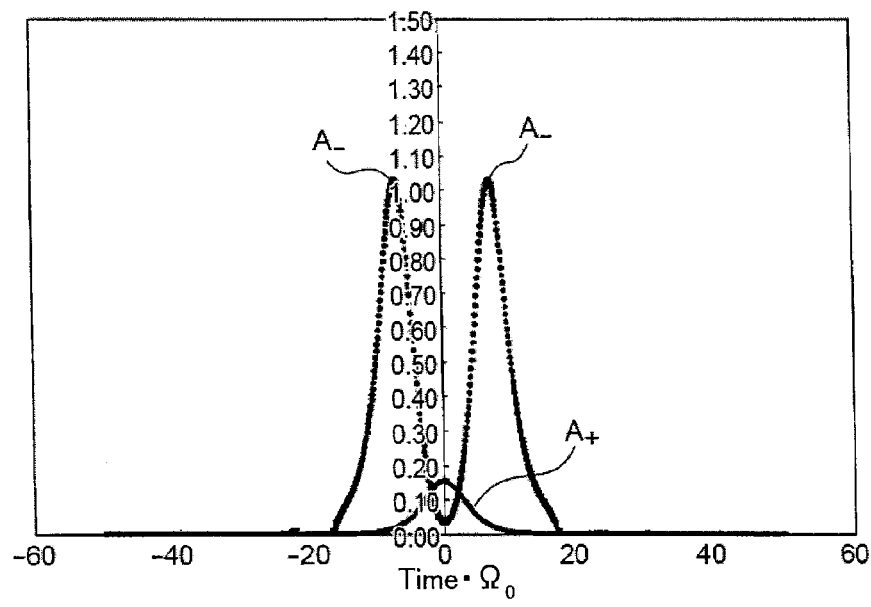
FIG. 16 is a graph showing a non-adiabatic effect corresponding to FIG. 15.
Figure 17:
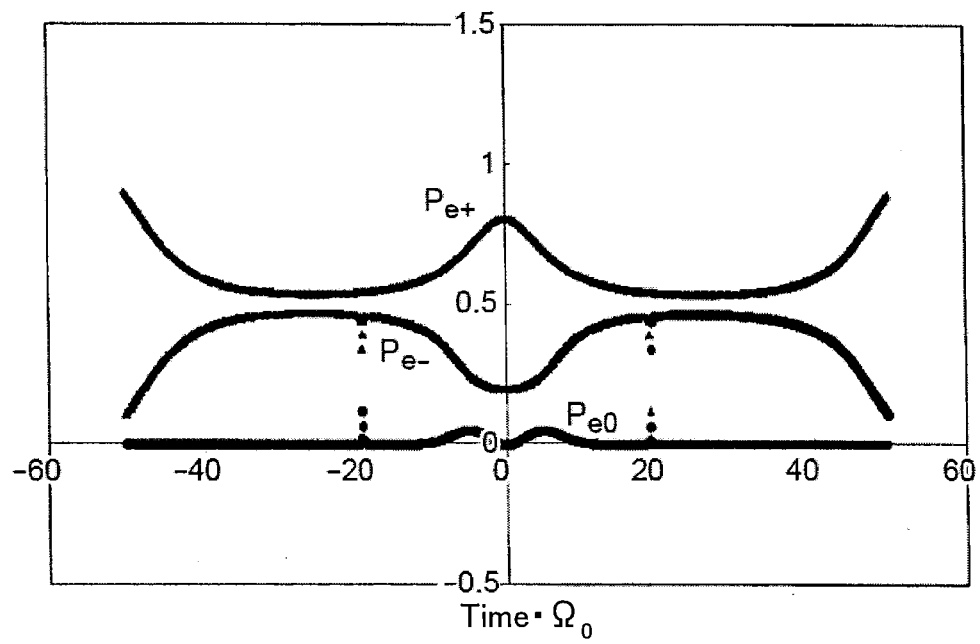
FIG. 17 is a graph showing a ratio of an excited state included in each eigenstate corresponding to FIG. 15.
Figure 18:
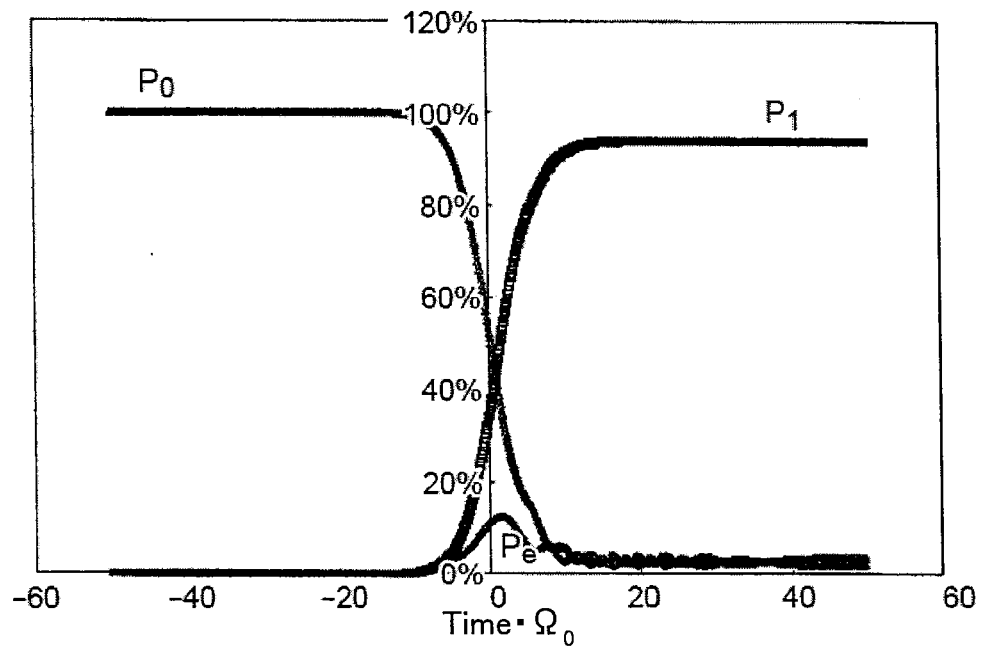
FIG. 18 is a graph showing population transfer corresponding to FIG. 15.

The non-adiabatic effects $A_\pm$ to the two eigenstates degenerated in a two-photon resonance are asymmetric as shown in FIG. 16 and the non-adiabatic effect $A_+$ is remarkably improved. On the other hand, although $A_-$ is worsened, $P_{e\pm}$ of the excited state populations $P_{e\pm}$ included in the eigenstates $|\phi_\pm\rangle$ is smaller at the center of the population transfer as shown in FIG. 17. Accordingly, as shown in FIG. 18, the oscillation during the population transfer can be reduced to have small amplitude. As a result, the fidelity of the population transfer is also improved. In general, it is considered that the above phenomenon can be used when the interval between the Gaussian pulses is wider than the optimum value and the adiabaticity is deteriorated at the center of the population transfer.

(Conventional Gate Operation of Phase Shift)

The phase shift can be treated using a Hamiltonian similar to that in the above STIRAP, while the pulse setting which does not involve population transfer is required. The pulse setting to cause no population transfer is required as a pulse waveform for the phase gate. That is, the respective STIRAP parameters such as $\theta$ change as a result of laser irradiation.

The population also changes from the initial state. Here, the pulse setting needs to return the parameters to initial values. This requires $\theta=0$ in both the initial state and the final state. There is known an example of pulse setting including a constant intensity and the Gaussian pulse, which is expressed with the following expression [Expression 14].

$$\begin{cases} \Omega_P = \kappa\Omega_0 \exp\left[-\frac{t^2}{2\sigma^2}\right] \\ \Omega_S = \Omega_0 \end{cases}$$ [Expression 14]

Setting the non-zero two-photon detuning allows it to produce the phase shift without changing populations.

Figure 20:
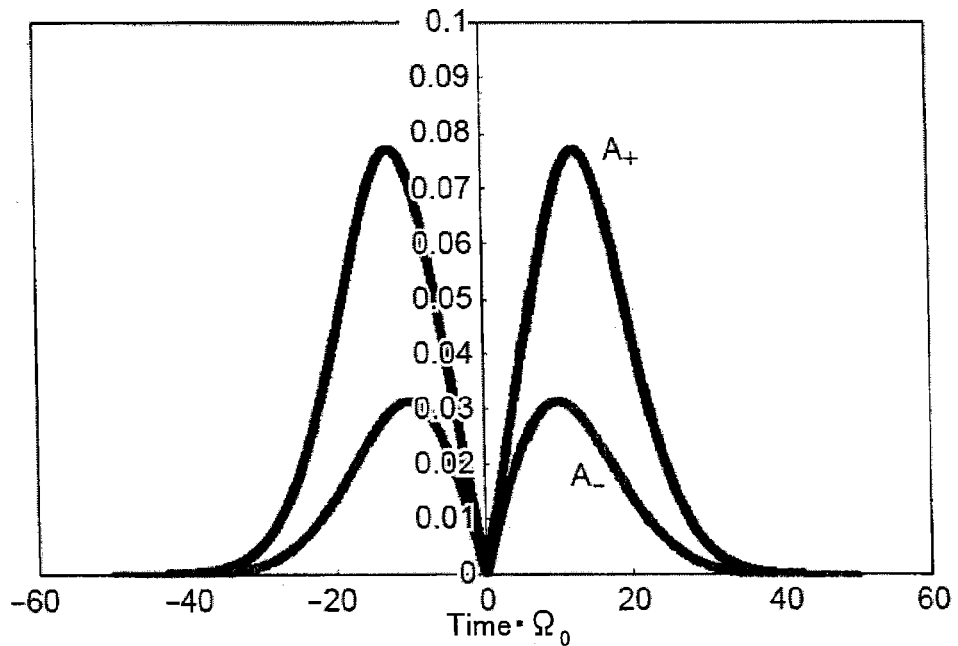
FIG. 20 is a graph showing a non-adiabatic effect corresponding to FIG. 19.
Figure 21:
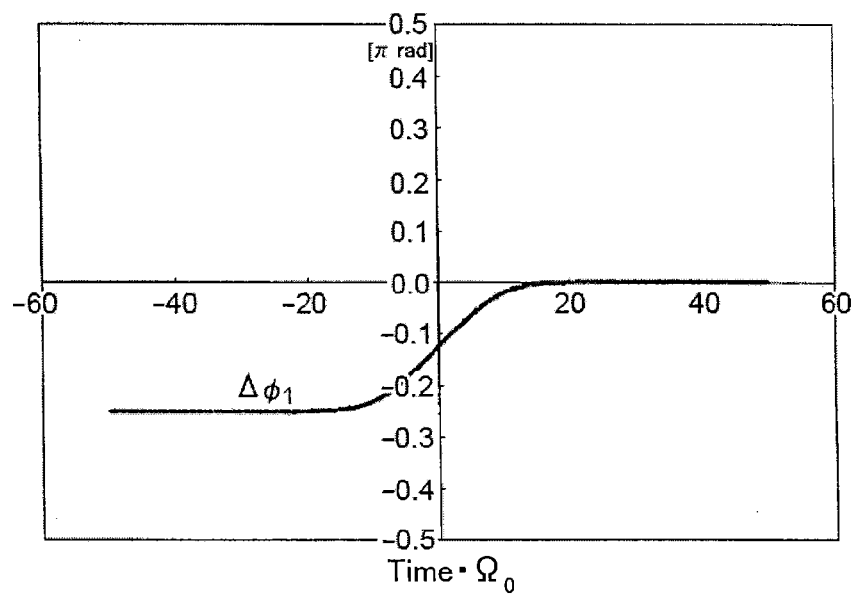
FIG. 21 is a graph showing a amount of phase shift corresponding to FIG. 19.
Figure 22:
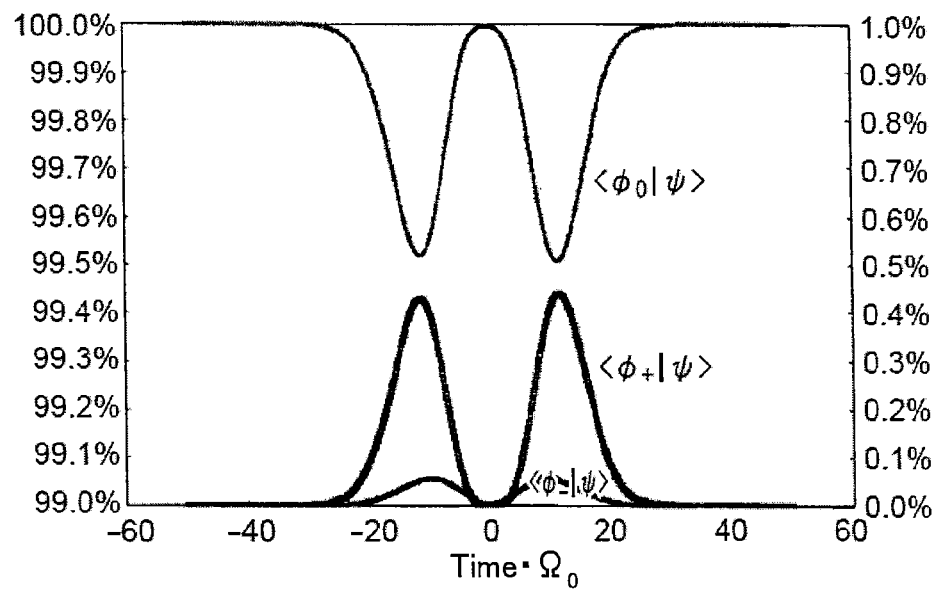
FIG. 22 is a graph showing each eigenstate included in a quantum state in FIG. 19.

Parameters of the phase gate operation will be described below. The two-photon detuning $\delta$ is one of the parameters to determine an amount of phase shift. Here, a peak intensity ratio $\kappa$ of the Gaussian pulse is also a parameter to provide the maximum value of $\theta$ and thus is a parameter related to the amount of phase shift. Further, the non-adiabatic effect A depends on both the two-photon detuning $\delta$ and the Gaussian pulse parameter $\kappa$. Accordingly, there exists a combination of $\delta$ and $\kappa$ which minimizes the non-adiabatic effect A among combinations of $\delta$ and $\kappa$ which provide the same amount of phase shift. As one example thereof, FIG. 21 shows an example of the combination of $\delta$ and $\kappa$ which minimizes the non-adiabatic effect when the amount of phase shift is $\pi/4$. That is, the example with the Rabi frequency and the detuning is shown in FIG. 21. The parameter sets are the combinations which provide a minimum non-adiabatic effect A obtained by numerical calculations when the amount of phase shift is $\pi/4$. The parameter sets produce a phase shift of $\pi/4$ as shown in FIG. 21 while reducing the non-adiabatic effect down to a small amount as shown in FIG. 20. As shown in FIG. 22, "rates of eigenstates" are defined as a ratio of each eigenstate included in an operating quantum state and 99.5% or more of the eigenstates continue to populate in the dark state.

(Improvement of Phase Gate Operation Using Two-Photon Detuning)

A method to improve the adiabaticity of the phase gate operation through time-dependent two-photon detuning, i.e., a main part of this disclosure will be described.

In the phase gate using the above-described constant two-photon detuning, the non-adiabatic effect becomes zero at time $t=0$ and the non-adiabatic effect peaks at both sides thereof. Meanwhile, the amount of phase shift at each time reaches a maximum at time $t=0$. This is contradictory to the fact that the non-adiabatic effect becomes zero at time $t=0$. This contradiction can be understood in terms of the followings. The non-adiabatic effect defined in the description uses an eigenvalue and an eigenstate obtained by diagonalizing a Hamiltonian at each time. Here, a lambda-type three-level system is evaluated for the adiabaticity. Therefore, a temporal change in a global phase of the three-level system, i.e., a temporal change in a relative phase between $|0\rangle$ and $|1\rangle$ is not included in the calculations. Accordingly, the non-adiabatic effect is zero whenever $t=0$ at which a temporal change in population is zero. That is, in order to evaluate the non-adiabatic effect in the phase gate more accurately by including a temporal change in the global phase, it is necessary to consider a differential term of the global phase. Although the differential term of the global phase contributes to the non-adiabatic effect less than the other terms, it is considered that the non-adiabatic effect to be improved by the two-photon detuning relates to the differential term of the global phase.

Further, time t=0 to maximize the amount of phase shift is time to provide θ with a peak value. If the two-photon detuning is also set to a large value even at the time t=0, the amount of phase shift becomes extremely large at the time t=0. Accordingly, it is considered that the two-photon detuning needs to be set as small as possible at time t=0. The following expression [Expression 15] is suggested as such a function system, thereby providing an inverse number of the Gaussian at the center of the phase gate and providing a constant value at the end of the phase gate.

$$\begin{cases} \Delta_P(t) = 0, 0 \\ \Delta_S(t) = [G(c_5)^4 + G(t)^4]^{-1/4} \\ G(t) \equiv \dfrac{1}{c_6} \exp\left(-\dfrac{t^2}{2c_7^2}\right) \\ \delta(t) \equiv \Delta_P(t) - \Delta_S(t) \end{cases}$$ [Expression 15]

Figure 23:
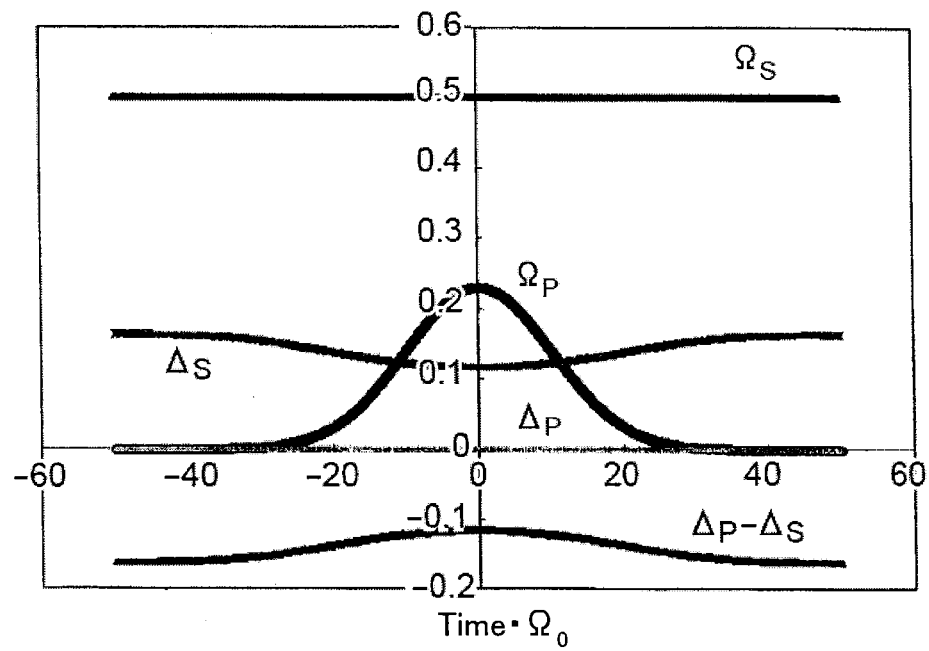
FIG. 23 is a graph showing time dependent two-photon detuning and Rabi frequencies.
Figure 24:
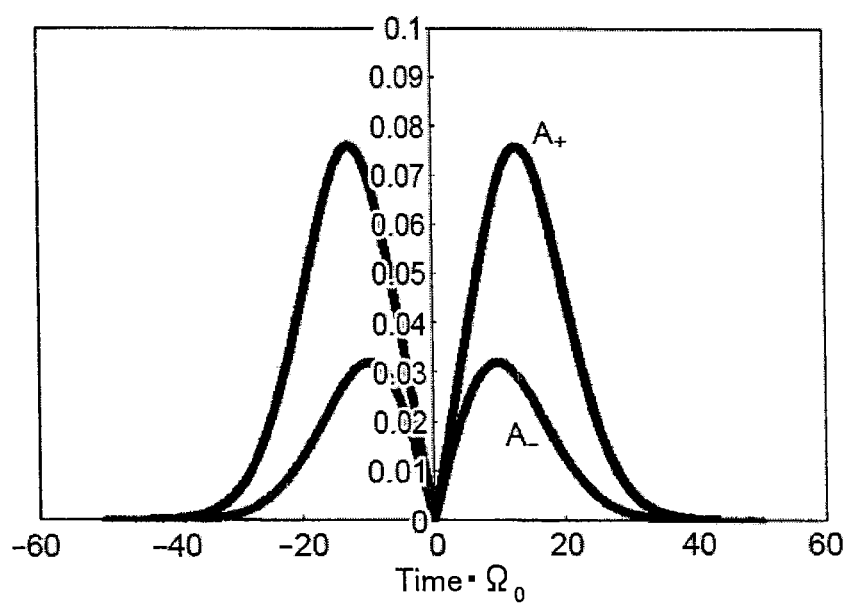
FIG. 24 is a graph showing a non-adiabatic effect in FIG. 23.
Figure 25:
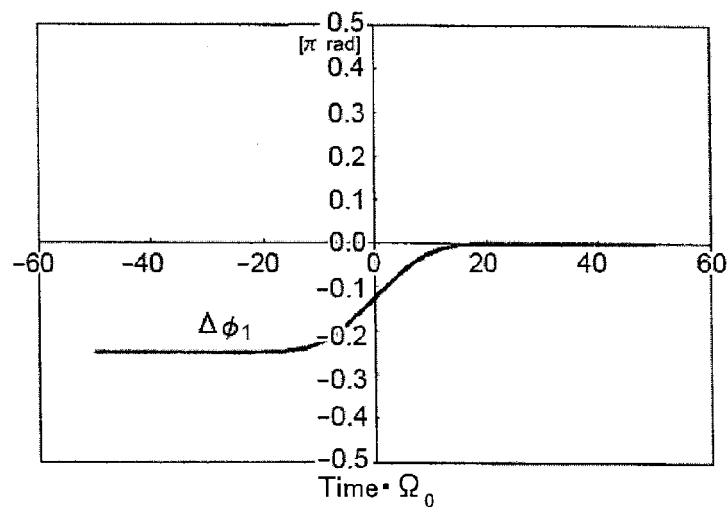
FIG. 25 is a graph showing an amount of phase shift in FIG. 23.
Figure 26:
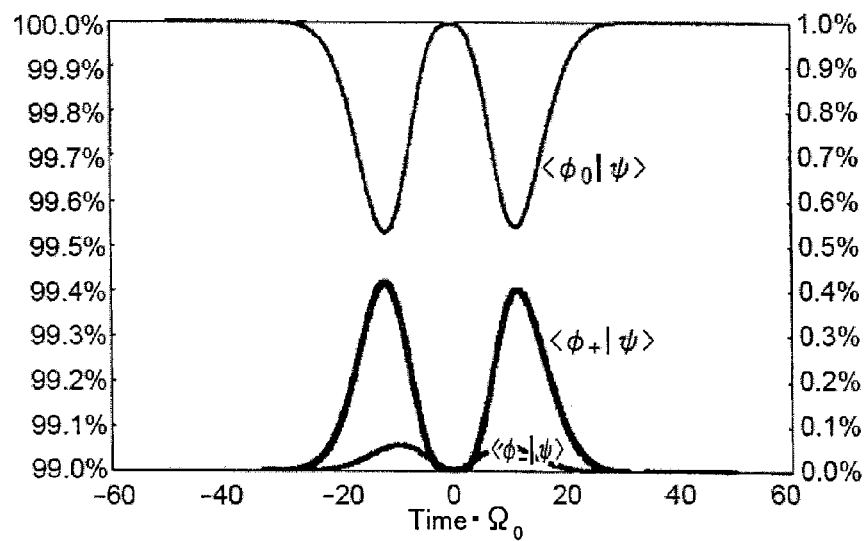
FIG. 26 is a graph showing each eigenstate included in a quantum state in FIG. 23.

Parameters are optimized for the phase gate of the constant two-photon detuning which is chosen from phase gates using the above function system and the optimization of the parameters thereof obtained by numerical calculations are shown specifically in the following graphs. The non-adiabatic effect and the rates of eigenstates are obtained as shown in FIGS. 25 and 26 in the gate operation to shift the phase by π/4 as shown in FIG. 24 by using the Rabi frequencies and the detuning as shown in FIG. 23. The result is shown to be improved in comparison with the constant two-photon detuning. The optimal phase gate in this example is improved to change from 99.8950% to 99.8957% using the constant two-photon detuning as an integral the rate of dark state. It is considered that the efficiency of the phase gate operation can be improved for an arbitrary phase shift by following the similar procedures.

EMBODIMENTS

Embodiments will be explained below.

First Embodiment

Figure 2:
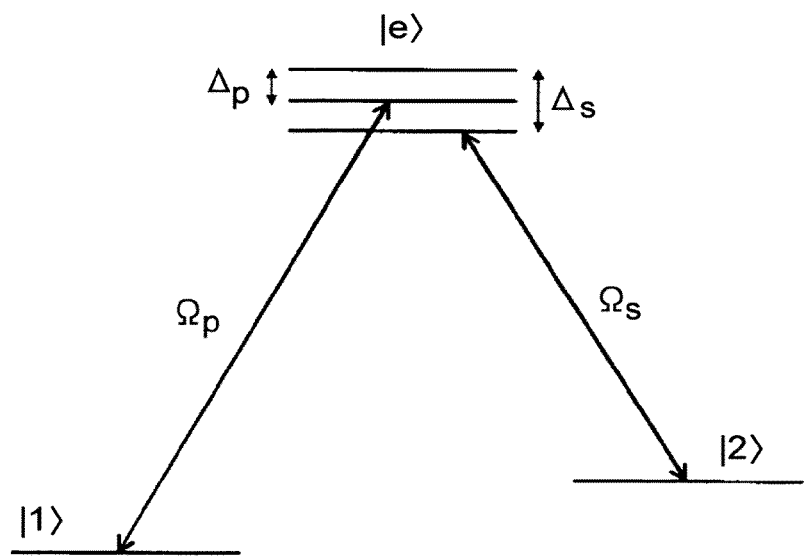
FIG. 2 is a view showing a three-level system, Rabi frequencies and detuning of an incident laser beam according to an embodiment.
Figure 27:
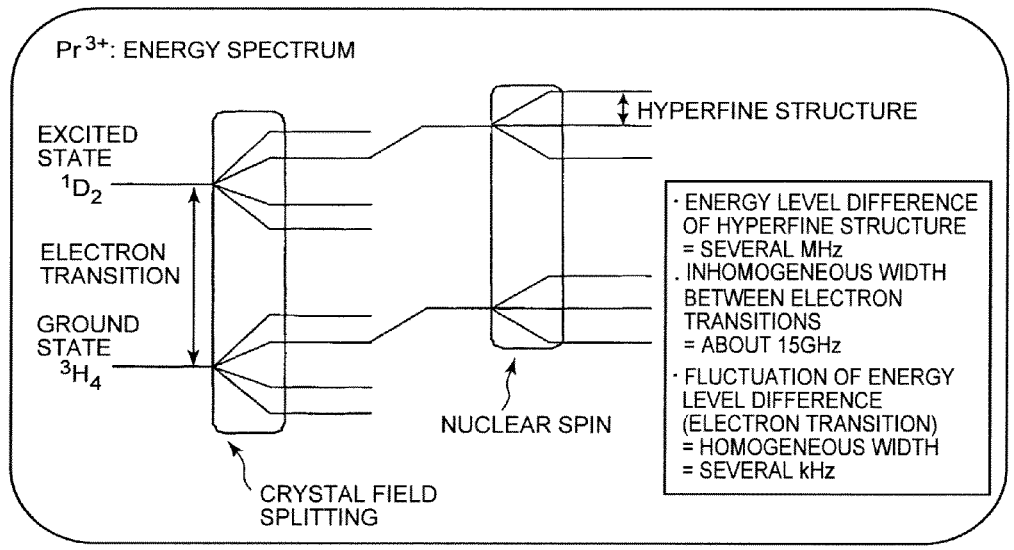
FIG. 27 shows a hyperfine structure of a physical system used for a qubit.

A crystal doped rare earth ions (i.e., $Pr^{3+}$:$Y_2SiO_5$) is prepared as a specimen and a hyperfine structure as shown in FIG. 27 are used as a system corresponding to a qubit. The three-level system as shown in FIG. 2 is a practical system to be used for the stimulated Raman adiabatic passage. Here, Ω denotes the Rabi frequency of a laser beam for irradiation and Δ denotes the detuning.

A ring dye laser 100 is used for a light source. An intensity and a frequency of the laser beam are adjusted to prescribed ones by making the laser beam incident on an acousto-optic modulator (AOM) 120 and an electro-optic modulator (EOM) 110.

Figure 28:
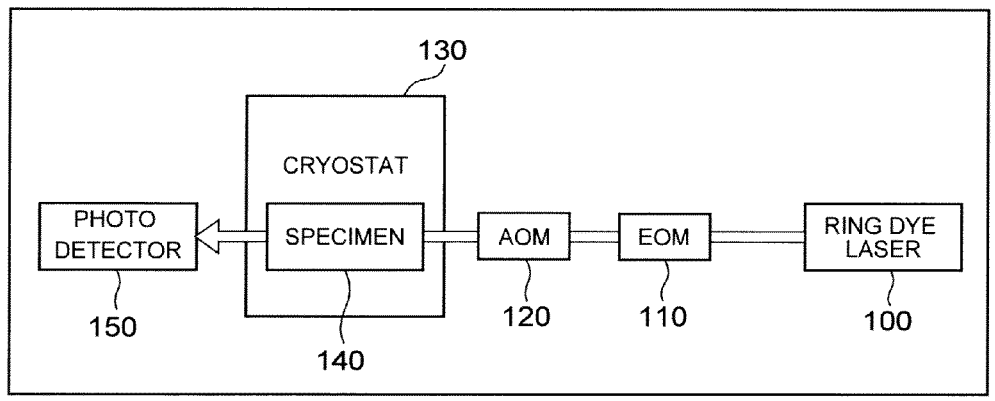
FIG. 28 shows an arrangement of devices to perform phase gate operation.

The specimen 140 is cooled down to 1.4K in a cryostat 130 and is irradiated with the laser beam adjusted by using the AOM 120 and the EOM 110. A beam passing through the specimen 140 is detected by a light detector 150. The above devices are arranged as shown in FIG. 28. Alternatively, the arrangement of FIG. 28 is only an example and the number and order of each device may be different therefrom.

Second Embodiment

A second embodiment will be explained to embody a claim 2.

Figure 6:
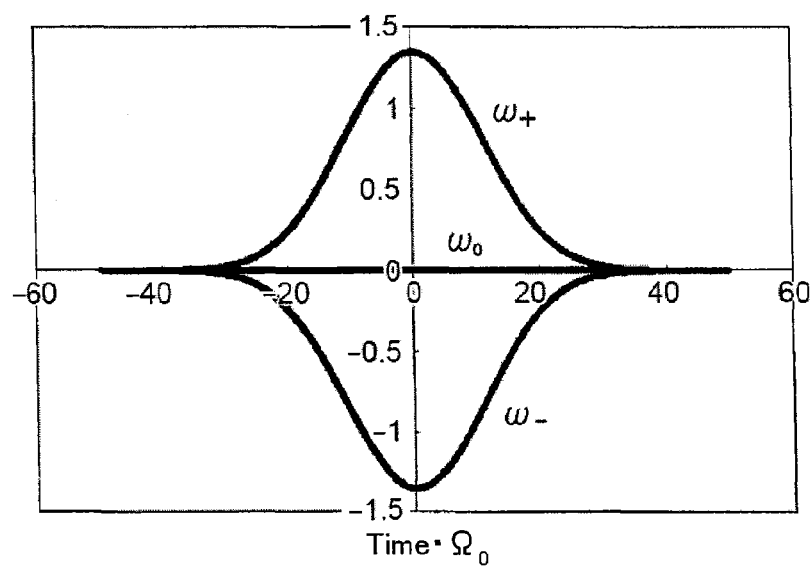
FIG. 6 is a graph showing degeneration of eigenenergy.
Figure 7:
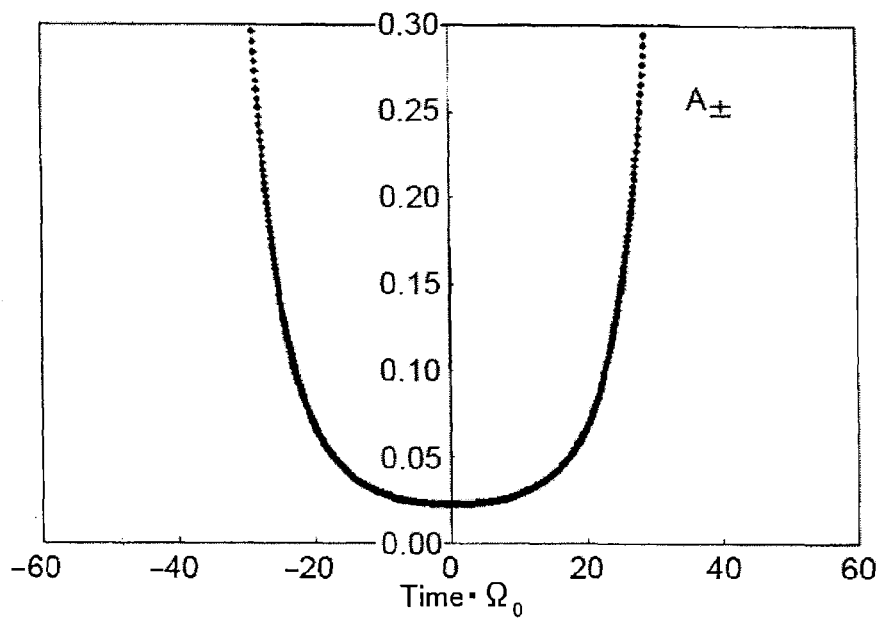
FIG. 7 is a graph showing a non-adiabatic effect in FIG. 6.
Figure 10:
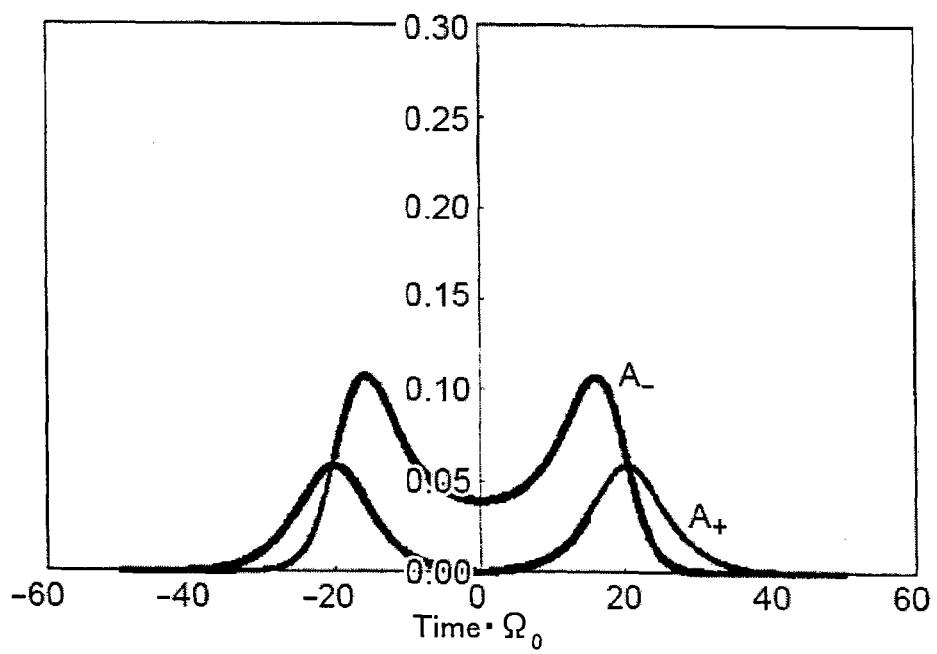
FIG. 10 is a graph showing that the non-adiabatic effect becomes small as a result of FIG. 8.

Here, when the non-adiabatic effect $A_\pm$ is varied as shown in FIG. 7 during the stimulated Raman adiabatic passage in accordance with an intensity change such as $\Omega_P$ and $\Omega_S$ in FIG. 6 in the method of the first embodiment, the frequency of the laser beam is changed in the following manner. If the non-adiabatic effect $A_\pm$ is 0.1 or more, the absolute value of the two-photon detuning is controllably decreased. If the non-adiabatic effect $A_\pm$ is 0.1 or less, the absolute value of the two-photon detuning is controllably increased. Thus, the frequency of the laser beam is changed using the acousto-optic modulator (AOM) 120 as well as $\Delta_P$ and $\Delta_S$ in FIG. 8. Accordingly, the non-adiabatic effect is improved as shown in FIG. 10 in comparison with FIG. 7, thereby allowing it to improve the efficiency of the stimulated Raman adiabatic passage.

Third Embodiment

A third embodiment will be explained to embody a claim 3.
Here, when the non-adiabatic effect $A_\pm$ changes as shown FIG. 13 during the STRAP involved in the intensity change such as $\Omega_P$ and $\Omega_S$ in FIG. 11 in the method of the first embodiment, the frequency of the laser beam is changed by using the acousto-optic modulator (AOM) 120 as well as with $\Delta_P$ and $\Delta_S$ to be changed in FIG. 15 so that the non-adiabatic effect $A_+$ showing the transition from an eigenstate $|\phi_0\rangle$ to an eigenstate $|\phi_+\rangle$ is smaller than the non-adiabatic effect $A_-$ showing the transition from an eigenstate $|\phi_0\rangle$ to an eigenstate $|\phi_-\rangle$, as shown in FIG. 16. The eigenstate $|\phi_0\rangle$ includes probability amplitude of the excited state $|e\rangle$. The eigenstate $|\phi_-\rangle$ has a lower rate of probability amplitude of the excited stat $|e\rangle$ than the eigenstate $|\phi_+\rangle$. As shown in FIG. 18, changing the frequency of the laser beam enables it to improve the efficiency of the STIRAP more than when using a constant frequency in FIG. 14.

Fourth Embodiment

A crystal doped rare earth ions (i.e., $Pr^{3+}$:$Y_2SiO_5$) is prepared as a specimen and a hyperfine structure as shown in FIG. 27 are used as a physical system corresponding to a qubit. The four-level system as shown in FIG. 1 is a practical system to be used for the phase gate operation. Here, Ω denotes the Rabi frequency of a laser beam for irradiation and Δ denotes the detuning.

A ring dye laser 100 is used for a light source. The intensity and frequency of the laser beam are adjusted to prescribed ones by making the laser beam incident on the acousto-optic modulator (AOM) 120 and the electro-optic modulator (EOM) 110. The specimen 140 is cooled down to 1.4K in a cryostat 130 and is irradiated with the laser light adjusted by using the AOM 120 and the EOM 110. A beam passing through the specimen 140 is detected by the light detector 150. The above devices are arranged as shown in FIG. 28. Alternatively, the arrangement of FIG. 28 is only an example and the number and order of each device may be different therefrom.

Fifth Embodiment

Figure 19:
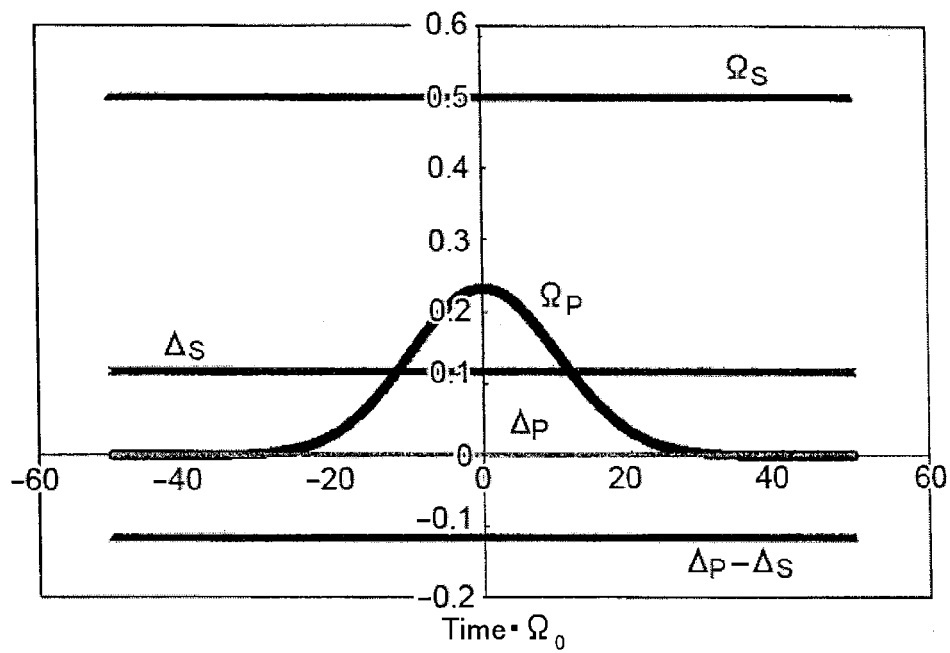
FIG. 19 is a graph showing Rabi frequencies and optimal detuning to shift a phase by $\pi/4$ by using constant two-photon detuning.

A fifth embodiment will be explained to embody a claim 5.
The phase gate operation is performed using intensity changes of $\Omega_P$ and $\Omega_S$ in FIG. 19 in the method of the fourth embodiment in order to rotate the relative phase between $|0\rangle$ and $|1\rangle$ by π/4 as shown in FIG. 21. In this phase gate operation, the frequency of the laser beam is changed using the acousto-optic modulator (AOM) 120 in such a manner that $\Delta_P$ and $\Delta_S$ change in FIG. 23, thereby enabling it to improve the efficiency of the phase gate operation as shown in FIG. 26 in comparison with that in FIG. 22 which uses a constant frequency.

As described above, according to the present embodiment, error probability of the phase gate operation can be reduced by up to 50% and the phase gate operation of a quantum computer can be accelerated approximately to be doubled.

While a certain embodiment of the invention has been described, the embodiment has been presented by way of examples only, and is not intended to limit the scope of the inventions. Indeed, the novel elements and apparatuses described herein may be embodied in a variety of other forms; furthermore, various omissions, substitutions and changes in the form of the methods described herein may be made without departing from the spirit of the invention. The accompanying claims and their equivalents are intended to cover such forms or modifications as would fall within the scope and spirit of the invention.

What is claimed is:

1. An operating method for stimulated Raman adiabatic passage to change probability amplitude of a state $|0\rangle$ and a state $|1\rangle$ used for qubits in a three-level system X including three states of $|0\rangle$, $|1\rangle$ and $|e\rangle$ in ascending order of energy levels, comprising:
   directing a first laser beam and a second laser beam at system X which have frequencies in the vicinity of resonance frequencies corresponding to an energy difference between $|0\rangle$ and $|e\rangle$ and an energy difference between $|1\rangle$ and $|e\rangle$, respectively; and
   changing temporally two-photon detuning ($\Delta P - \Delta_S$) to be a difference between first detuning ($\Delta_P$) and second detuning ($\Delta_S$), the first detuning ($\Delta_P$) being a difference between a first energy difference and a frequency of the first laser beam, the first energy difference being a difference between energy of $|0\rangle$ and energy of $|e\rangle$, the second detuning ($\Delta s$) being a difference between a second energy difference and a frequency of the second laser beam, the second energy difference being a difference between energy of $|1\rangle$ and energy of $|e\rangle$.

2. The method according to claim 1, further comprising:
   directing a third laser beam and a fourth laser beam at a three-level system X' which includes three states of $|0'\rangle$, $|1'\rangle$ and $|e'\rangle$ in ascending order of energy levels, the three-level system X' having same properties to those of the three-level system X, the third laser beam and fourth laser beam having frequencies in a vicinity of resonance frequencies corresponding to an energy difference between $|0'\rangle$ and $|e'\rangle$ and an energy difference between $|1'\rangle$ and $|e'\rangle$, respectively, the third laser beam and fourth laser beam having intensity equal to that of the first laser beam and second laser beam;
   changing temporally two-photon detuning ($\Delta'_P - \Delta'_S$) to be a difference between third detuning ($\Delta'_P$) and fourth detuning ($\Delta'_S$), the third detuning ($\Delta'_P$) being a difference between a third energy difference and a frequency of the third laser beam, the third energy difference being a difference between energy of $|0'\rangle$ and energy of $|e'\rangle$, the fourth detuning ($\Delta'_S$) being a difference between a fourth energy difference and a frequency of the fourth laser beam, the fourth energy difference being a difference between energy of $|1'\rangle$ and energy of $|e'\rangle$, and
   changing temporally frequencies of the first laser beam and second laser beam to irradiate the three-level system X therewith reference to temporal change of an eigenenergy, an eigenstate and a quantum state of the three-level system X', wherein
an absolute value of the two-photon detuning ($\Delta_P - \Delta_S$) is increased more at a specific time than at an other time, the specific time being defined as time when a non-adiabatic effect (a dimensionless parameter) expressed with the following equation [Expression a] reaches 0.1 or more, the non-adiabatic effect determining state transition probability from an eigenstate $|a'\rangle$ to other eigenstate $|b_i'\rangle$, the eigenstate $|a'\rangle$ having an eigenenergy $E_a'$ in the three-level system X' and corresponding to the eigenstate $|a\rangle$ having an eigenenergy $E_a$ in the three-level system X, the other eigenstate $|b_i'\rangle$ (i=1, 2, 3) having an eigenenergy $E_{b'i}$ in the three-level system X', [Expression a] being $$A(a',b'_i) \equiv |\langle \dot{a}'|b'_i\rangle|/|E_{a'}-E_{b'i}| \quad \text{[Expression a]}$$

the dot meaning time derivative in [Expression a].

3. The method according to claim 1, wherein
a non-adiabatic effect $A(a',b_i')$ is made to be lower than a non-adiabatic effect $A(a',b'_j)$ during the stimulated Raman adiabatic passage operation, the effect $A(a',b_i')$ representing transition from an eigenstate $|a'\rangle$ to an eigenstate $|b_i'\rangle$, the eigenstate $|b_i'\rangle$ including probability amplitude of the excited state $|e\rangle$, the non-adiabatic effect $A(a',b_j')$ representing transition from an eigenstate $|a'\rangle$ to an eigenstate $|b_j'\rangle$, the eigenstate $|b_j'\rangle$ including less probability amplitude of the excited state $|e\rangle$ than an eigenstate $|b_i'\rangle$, $$A(a',b'_i) \equiv |\langle \dot{a}'|b'_i\rangle|/|E_{a'}-E_{b'i}| \quad \text{[Expression a]}$$

the effect $A(a',b_i')$ is expressed with following equation [Expression b], $$A(a',b'_j) \equiv |\langle \dot{a}'|b'_j\rangle|/|E_{a'}-E_{b'j}| \quad \text{[Expression b]}$$

the dot meaning time derivative in [Expression a, Expression b].

4. A method for phase gate operation to rotate a relative phase between a state $|0\rangle$ and a state $|1\rangle$ in a four-level system X including four states of $|0\rangle$, $|1\rangle$, $|2\rangle$ and $|e\rangle$ in ascending order of energy levels, comprising:
   directing a first laser beam and a second laser beam which have frequencies in the vicinity of resonance frequencies corresponding to an energy difference between $|1\rangle$ and $|e\rangle$ and an energy difference between $|2\rangle$ and $|e\rangle$, respectively; and
   changing temporally two-photon detuning ($\Delta_P - \Delta_S$) to be a difference between first detuning ($\Delta_P$) and second detuning ($\Delta_S$), the first detuning ($\Delta_P$) being a difference between a first energy difference and a frequency of the first laser beam, the first energy difference being a difference between energy of $|1\rangle$ and energy of $|e\rangle$, the second detuning ($\Delta_S$) being a difference between a second energy difference and a frequency of the second laser beam, the second energy difference being a difference between energy of $|2\rangle$ and energy of $|e\rangle$.

5. The method according to claim 4, further comprising:
   directing a third laser beam and a fourth laser beam at a four-level system Y which includes four states of $|0'\rangle$, $|1'\rangle$, $|2'\rangle$ and $|e'\rangle$ in ascending order of energy levels, the four-level system Y having same properties to those of the four-level system X, the third laser beam and fourth laser beam having frequencies in a vicinity of resonance frequencies corresponding to an energy difference between $|1'\rangle$ and $|e'\rangle$ and an energy difference between $|2'\rangle$ and $|e'\rangle$, respectively, the third laser beam and fourth laser beam having intensity equal to that of the first laser beam and second laser beam;

changing temporally two-photon detuning ($\Delta'_P - \Delta'_S$) to be a difference between third detuning ($\Delta'_P$) and fourth detuning ($\Delta'_S$), the third detuning ($\Delta'_P$) being a difference between a third energy difference and a frequency of the third laser beam, the third energy difference being a difference between energy of $|1'\rangle$ and energy of $|e'\rangle$, the fourth detuning ($\Delta'_S$) being a difference between a fourth energy difference and a frequency of the fourth laser beam, the fourth energy difference being a difference between energy of $|2'\rangle$ and energy of $|e'\rangle$, and changing temporally frequencies of the first laser beam and the second laser beam to irradiate the four-level system X therewith reference to temporal change of an eigenenergy, an eigenstate and a quantum state of the four-level system Y, wherein the two-photon detuning ($\Delta_P - \Delta_S$) is made to be larger than the two-photon detuning ($\Delta'_P - \Delta'_S$) at time when intensities of the first laser beam and the third laser beam reach a maximum, provided that:

the second laser beam and the fourth laser beam have constant intensities;

the first laser beam and the third laser beam have time-variable intensities;

the four-level system X is irradiated with the first laser beam and the second laser beam;

the four-level system Y is irradiated with the third laser beam and the fourth laser beam; and a shift amount of a relative phase between the state $|0\rangle$ and the state $|1\rangle$ is equal to a shift amount of a relative phase between the state $|0'\rangle$ and the state $|1'\rangle$.

\* \* \* \* \*